US007832105B2

(12) United States Patent
Vogel (10) Patent No.: US 7,832,105 B2
(45) Date of Patent: Nov. 16, 2010

(54) WATER PLANT REMOVAL TOOL (76) Inventor: Craig Vogel, 4197 Eckhardt Rd., Eden, NY (US) 14058

( * ) Notice: Subject to any disclaimer, the term of this patent is extended or adjusted under 35 U.S.C. 154(b) by 40 days.

(21) Appl. No.: 11/876,316

(22) Filed: Oct. 22, 2007

(65) Prior Publication Data
US 2009/0100685 A1 Apr. 23, 2009

(51) Int. Cl.
B26B 17/00 (2006.01)
(52) U.S. Cl. .......................... 30/166.3; 30/250; 30/300; 30/309; 56/8; 56/255
(58) Field of Classification Search ................ 30/250, 30/166.3, 309, 317, 356, 300, 318, 249, 258, 30/276; 209/614, 417, 615, 419, 418; 56/8, 56/239, 289, 255, 9; D8/7, 12; 294/2
See application file for complete search history.

(56) References Cited

U.S. PATENT DOCUMENTS

| 1,367,380 | A | * | 2/1921 | Haas | 30/318 |
|---|---|---|---|---|---|
| 1,379,205 | A | * | 5/1921 | Ogden | 30/309 |
| 1,432,241 | A | * | 10/1922 | Goodwin | 30/248 |
| 1,761,503 | A | * | 6/1930 | Tonhardt | 294/50.8 |
| 1,878,689 | A | | 9/1932 | Flack | |
| 1,931,045 | A | * | 10/1933 | Vosbikian et al. | 30/237 |
| 2,005,694 | A | * | 6/1935 | Vosbikian et al. | 30/237 |
| 496,260 | A | | 11/1938 | Howard | |
| 2,469,983 | A | * | 5/1949 | Newbold | 30/248 |
| 2,521,854 | A | | 9/1950 | King | |
| 2,649,327 | A | | 8/1953 | Fortin et al. | |
| 2,662,287 | A | * | 12/1953 | Ferguson | 30/287 |
| 2,702,975 | A | | 3/1955 | Friesen | |
| 776,788 | A | | 6/1957 | Howard | |
| 2,864,225 | A | | 12/1958 | Williams | |
| 2,949,003 | A | * | 8/1960 | Wilcox | 56/8 |
| 2,996,091 | A | * | 8/1961 | Snook | 30/517 |
| 3,002,319 | A | | 10/1961 | Laughlin | |
| 3,546,857 | A | | 12/1970 | Henning | |
| 3,596,444 | A | | 8/1971 | Beattie | |
| 3,601,956 | A | * | 8/1971 | Akermanis | 56/8 |
| 4,093,031 | A | | 6/1978 | Portz | |
| 4,216,844 | A | * | 8/1980 | Klafs | 182/104 |
| 4,375,299 | A | | 3/1983 | Laven | |
| 4,583,353 | A | * | 4/1986 | Shaver | 56/8 |
| 4,697,488 | A | | 10/1987 | Cole | |
| 4,768,331 | A | | 9/1988 | Jones | |
| 4,837,931 | A | | 6/1989 | Beermann | |
| 4,852,337 | A | | 8/1989 | Peterson | |

(Continued)

FOREIGN PATENT DOCUMENTS

CA 852448 9/1970

(Continued)

Primary Examiner—Ghassem Alie
(74) Attorney, Agent, or Firm—Woods Oviatt Gilman LLP; Katherine H. McGuire, Esq.

(57) ABSTRACT

A manually operable cutting tool for removing vegetation from a body of water such as along the shoreline of a pond or lake includes a handle and a pair of angularly adjustable cutting blades. The blades are selectively, pivotally adjustable between fully open and fully closed angular positions for ease and safety of handling. An optional floatation bar may be provided for attaching to the blades which allows the blades to be pulled across the surface of the water for collecting floating weeds.

6 Claims, 8 Drawing Sheets

U.S. PATENT DOCUMENTS

| | | | |
|---|---|---|---|
| D321,459 S | 11/1991 | Myrland | |
| 5,079,905 A | 1/1992 | Bergstrom | |
| 5,146,734 A | 9/1992 | Smyczek | |
| 5,152,126 A | 10/1992 | Cousineau | |
| 5,201,168 A | 4/1993 | Jenson | |
| 5,430,998 A | 7/1995 | Albrecht | |
| 5,450,713 A | 9/1995 | Rohde | |
| 6,250,054 B1 | 6/2001 | Kramer | |
| 6,920,744 B2 | 7/2005 | Shonnard | |
| 7,111,741 B2 | 9/2006 | Bramante | |
| 2003/0136096 A1* | 7/2003 | Kretsch | 56/8 |
| 2003/0172634 A1* | 9/2003 | Hay | 56/8 |

FOREIGN PATENT DOCUMENTS

| | | |
|---|---|---|
| CA | 870328 | 5/1971 |
| GB | 496260 | 11/1938 |
| GB | 826258 | 12/1959 |
| GB | 915004 | 1/1963 |
| GB | 2381038 | 4/2003 |
| GB | 190824182 | 7/2009 |
| RU | 1563624 | 5/1990 |
| WO | 2004021761 | 3/2004 |

\* cited by examiner

WATER PLANT REMOVAL TOOL

BACKGROUND OF THE INVENTION

The present invention relates to a hand operated tool for removing aquatic vegetation from bodies of water such as ponds, lakes and ocean shorelines, for example.

Vegetation (e.g., cattails) growing in the water near a shore line is undesirable when it interferes with people trying to enjoy the water (e.g., during swimming, fishing, and boating, for example). While there have been many methods and tools proposed in the past to remove the vegetation, these prior tools and methods have not been entirely satisfactory in performance and ease of use. For example, some proposed tools have elongated, V-shaped blades which are pulled through the vegetation to cut through the stalks of the plants. The tool is manually pulled by a line by a person standing along the shoreline. Should the line break, the person would then have to wade into the water to retrieve the blade head, a potentially dangerous situation should the person accidentally step on a submerged head in the water, for example. The blades on this tool are also very sharp and dangerous to work with, particularly when moving the tool into and out of the water and storage. Furthermore, the angle of the blades and direction of pull (i.e., a sharp "V" configuration where the point of the "V" points in the direction of travel against the plants) limits the cutting swath and cutting angle such that it takes many draws of the tool through the water to cut away a large area of vegetation. Yet a still further potential problem with some V-shaped blade designs is the fact that many people would find it too large to easily and safely handle.

There therefore remains a need for a water plant removal rake that is easy to use and effective for removing large swaths of water plants during a single pull operation of the tool through the water, and is safe to handle and use.

SUMMARY OF THE INVENTION

The present invention successfully addresses the above needs by providing a water plant removal tool having a handle in the form of an elongated handle with a pair of pivotally adjustable blades at the cutting end of the handle. A user places the blades in the water at the location of the plants and pulls the handle and blades towards him/herself. The blades are curved and mounted on the handle with the concave, cutting edge of the blades facing the direction of pull. The cutting edges are preferably serrated to provide a sawing action against the plants whose stalks may be quite thick. The blades are adjustable between a fully closed position wherein they overlap with one another, and a fully open position where they extend in opposite directions and together provide a large and substantially continuous cutting blade span. Thus, the user may adjust the cutting angle of the blades depending on the thickness of the stalks to be cut. For example, when cutting very thick cattail stalks, the user may adjust the blades to a narrow angle which allows the user to pull the blades through thick stalks with greater ease. Once a path through the stalks is cleared, the user may then adjust the blades to a wider angle and clear the remaining stalks at a greater rate.

An optional floatation bar may be removably attached to the cutting head to allow the cutting head to float upon the surface of the water. This allows the user to rake in weeds which may be floating on the surface of the water. Optional handle extensions may also be provided in various lengths such as three and six foot lengths, for example.

DETAILED DESCRIPTION

Referring now to the drawing, there is seen in the Figures an embodiment of the inventive tool designated generally by the reference numeral 10. Tool 10 generally includes three main parts: first and second blades 12 and 14, and a handle 16 to which the blades are mounted. Blades 12 and 14 each include a connected end 12a, 14a, and an opposite free end 12b, 14b, respectively. Blades 12 and 14 are curved and further include a preferably serrated cutting edge 12c, 14c along the concave edge thereof while the opposite, convex edges 12d, 14d are not sharp and safe to the touch. Optional handle extensions 16' for attaching to the proximal end 16a of handle 16 may also be provided in various lengths such as three and six foot lengths, for example.

Connecting ends 12a, 14a are pivotally and adjustably mounted to the handle distal end 16b. The pivot connection is provided by a pin 20' extending through aligned holes 12e, 14e. Angular adjustability between the blades is provided by a series of holes 12f-l and 14f-l which are laid in an annularly spaced pattern such that they sequentially align with one another as the blades are pivoted about point 12e, 14e between a fully closed position seen in FIG. 4, and a fully open position seen in FIG. 8. In the embodiment shown and described herein, a total of five different angular positions of the blades is possible as shown in FIGS. 4 through 8, respectively. It is understood that it is possible to make the tool with a different number and degree of possible angular positions although at least two positions, fully open and fully closed, are desired.

An element for locking the blades in the desired angular orientation may be provided by any suitable means. For example, one or more bolt and nut pairs, or a locking or spring loaded pin such as pin 20 seen in FIG. 9A, may be passed through aligned holes in the blades. To adjust the blades between different angular positions, the pin 20 is simply pressed inside one of the aligned holes to disengage the angular lock and thereby allow one blade to pivot with respect to the other blade about pivot point 12e, 14e. Releasing the pin causes the pin to extend through the aligned holes and lock the blades in place.

Figure 9A:
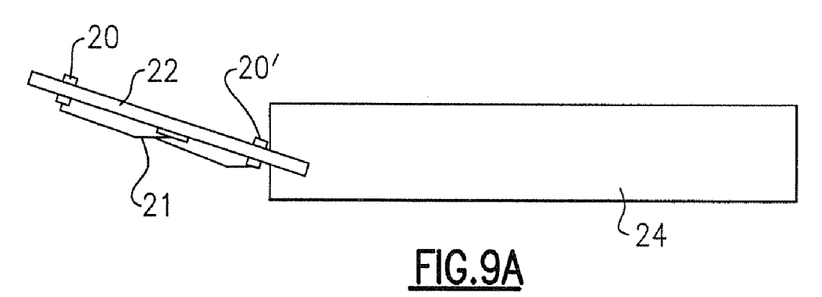
FIGS. 9A and 9B are side elevational and top plan views, respectively, of an optional blade indexing plate.
Figure 9B:
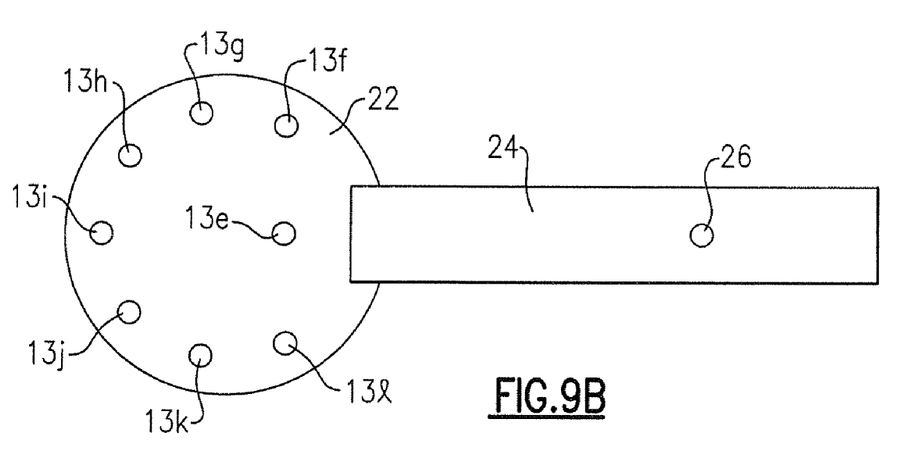

An optional blade indexing plate 22 is also shown in FIGS. 9A and 9B. Indexing plate 22 may be attached to handle 16 via a sleeve 24 which telescopes over the distal end of handle 16 and secured thereto via a pin, screw, bolt or the like as indicated at 26. Indexing plate 22 includes a plurality of annularly spaced holes 13*e*-1 over which the selectively aligned holes in blades 12, 14 may be aligned and secured via pins 20, 20'. Pins 20, 20' may be tethered to plate 22 by lines 21 to ensure pins 20, 20' are not separated from tool 10.

Figure 8:
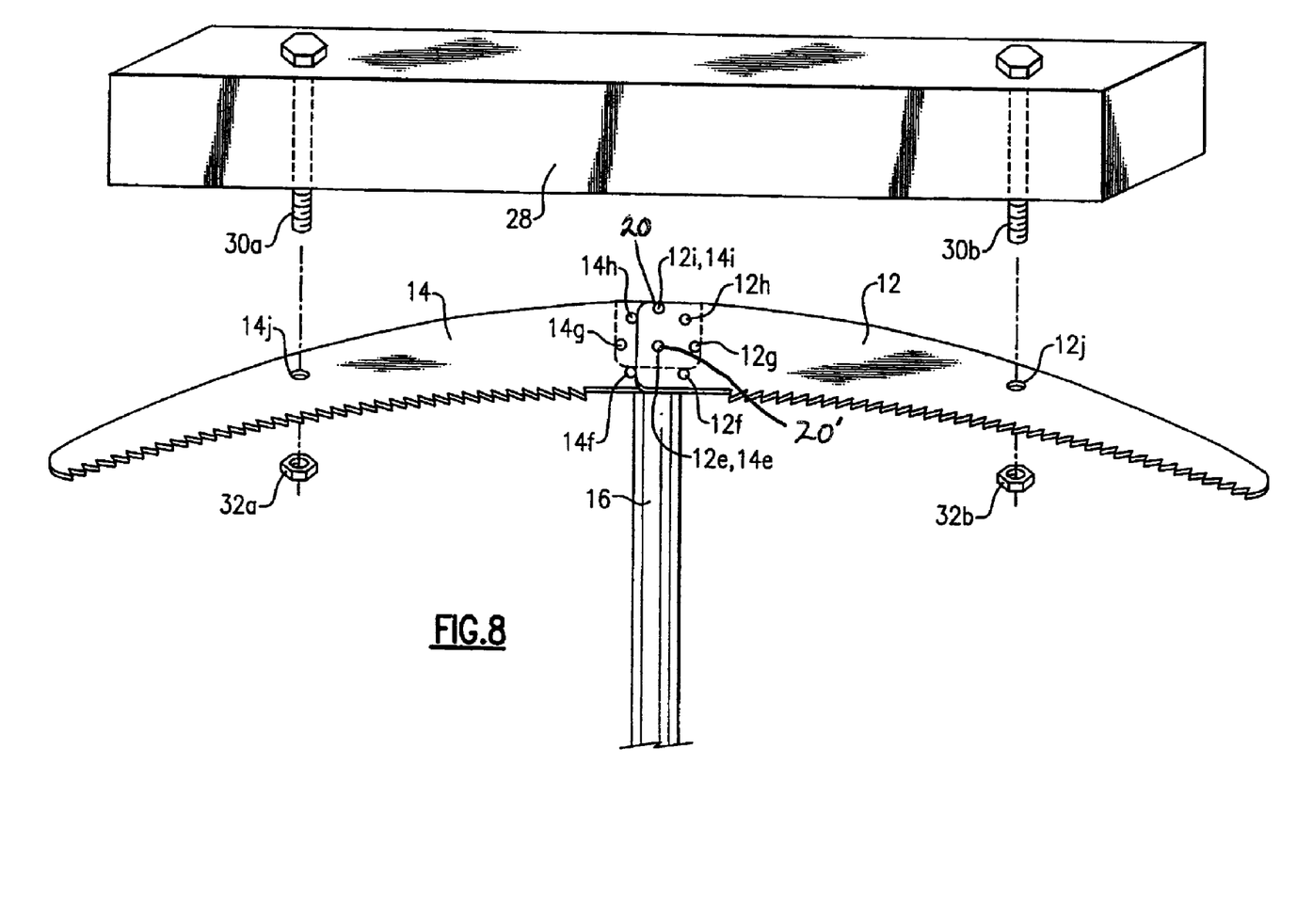
FIG. 8 is a plan view of the tool showing the blades in the fully open position on the handle and an optional floatation bar.

An optional floatation bar 28 may be provided for removably attaching the blades 12, 14 when in their fully open position seen in FIG. 8. A pair of bolts 30*a,b* may extend through bar 28 and align with and extend through holes 12*j*, 14*j* formed in blades 12, 14 and secured with nuts 32*a,b*, respectively. As stated above, floating bar 28 allows the cutting head to float upon the surface of the water 23. This allows the user to rake in weeds 18 which may be floating on the surface of the water.

Figure 1:
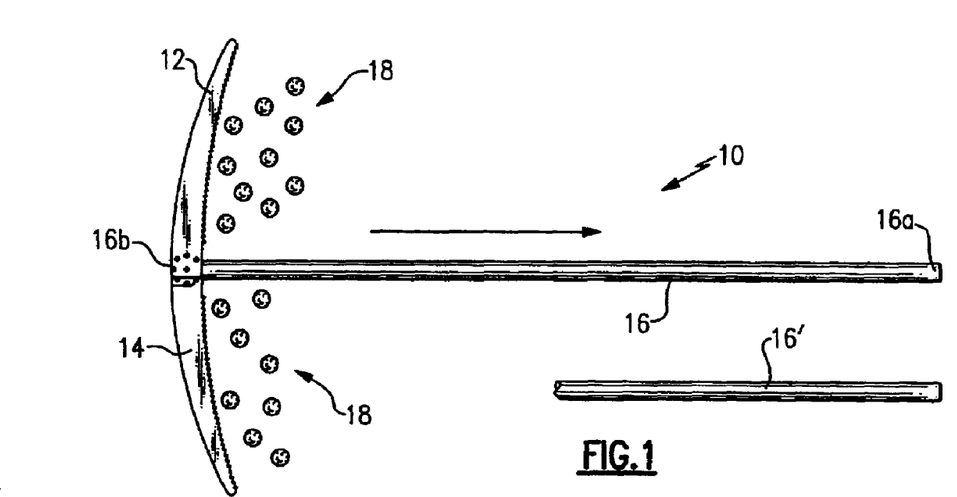
FIG. 1 is a top plan view of the tool shown in the process of being pulled through an area of water plants.
Figure 2:
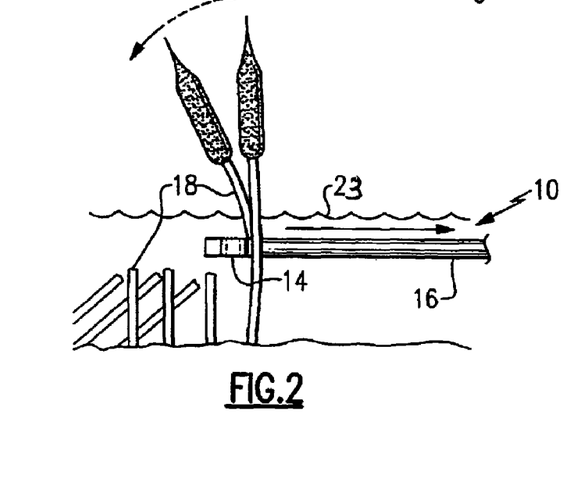
FIG. 2 is a side elevational view showing the cutting action of the tool as it is being pulled through an area of water plants.
Figure 3:
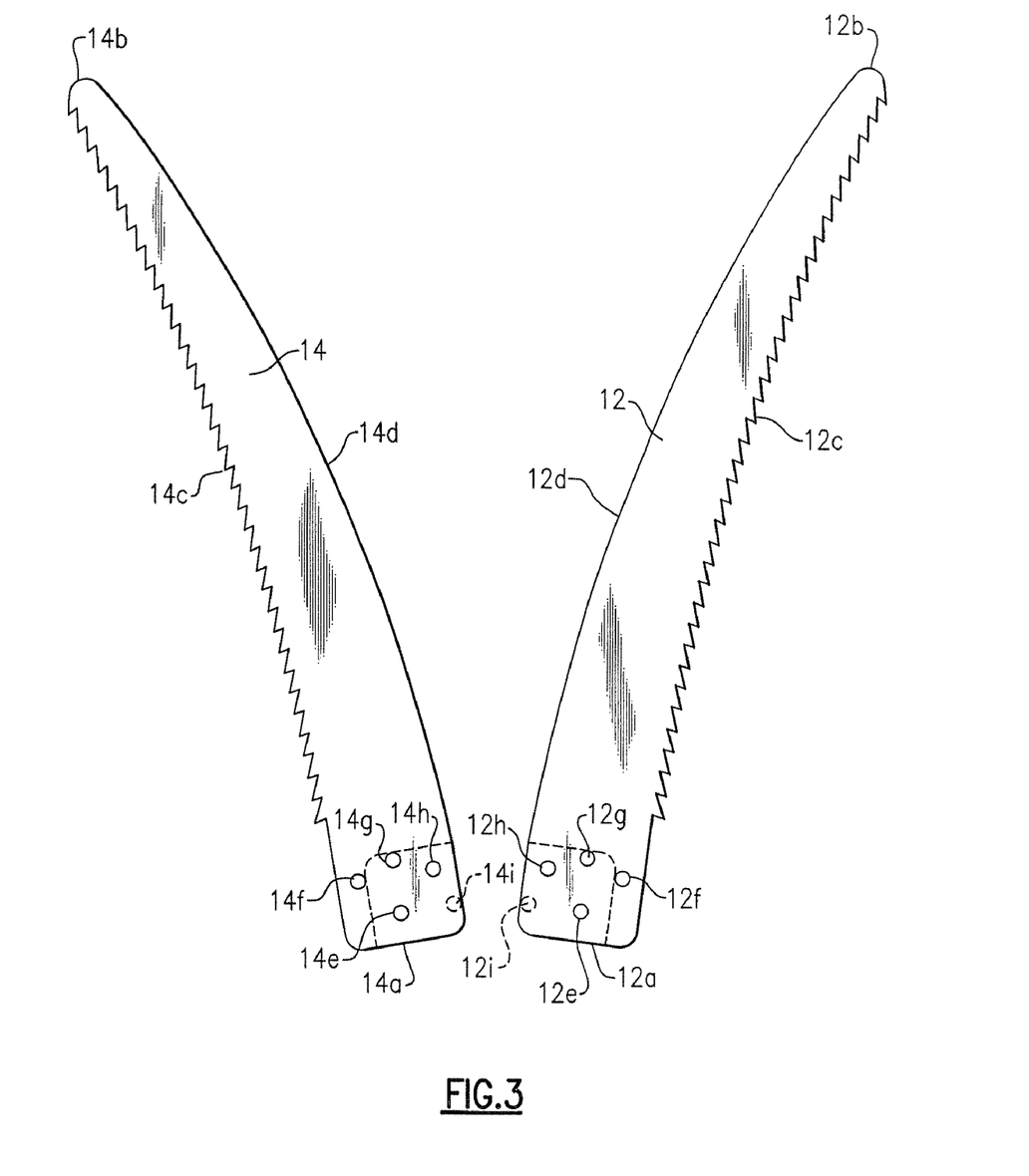
FIG. 3 is a plan view of a pair of blades unattached to the handle.
Figure 4:
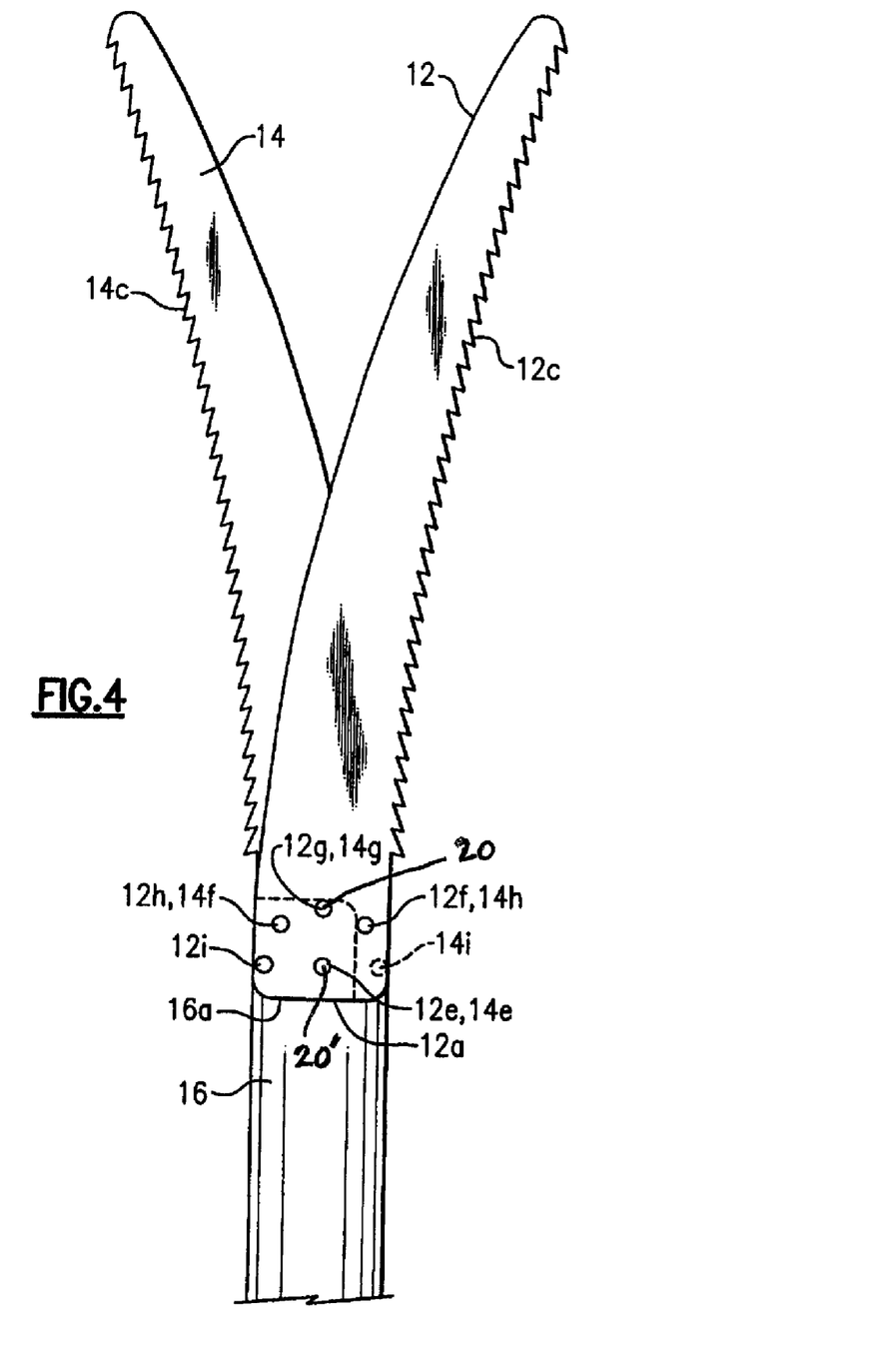
FIG. 4 is a plan view of the tool showing the blades in the fully closed position on the handle.
Figure 5:
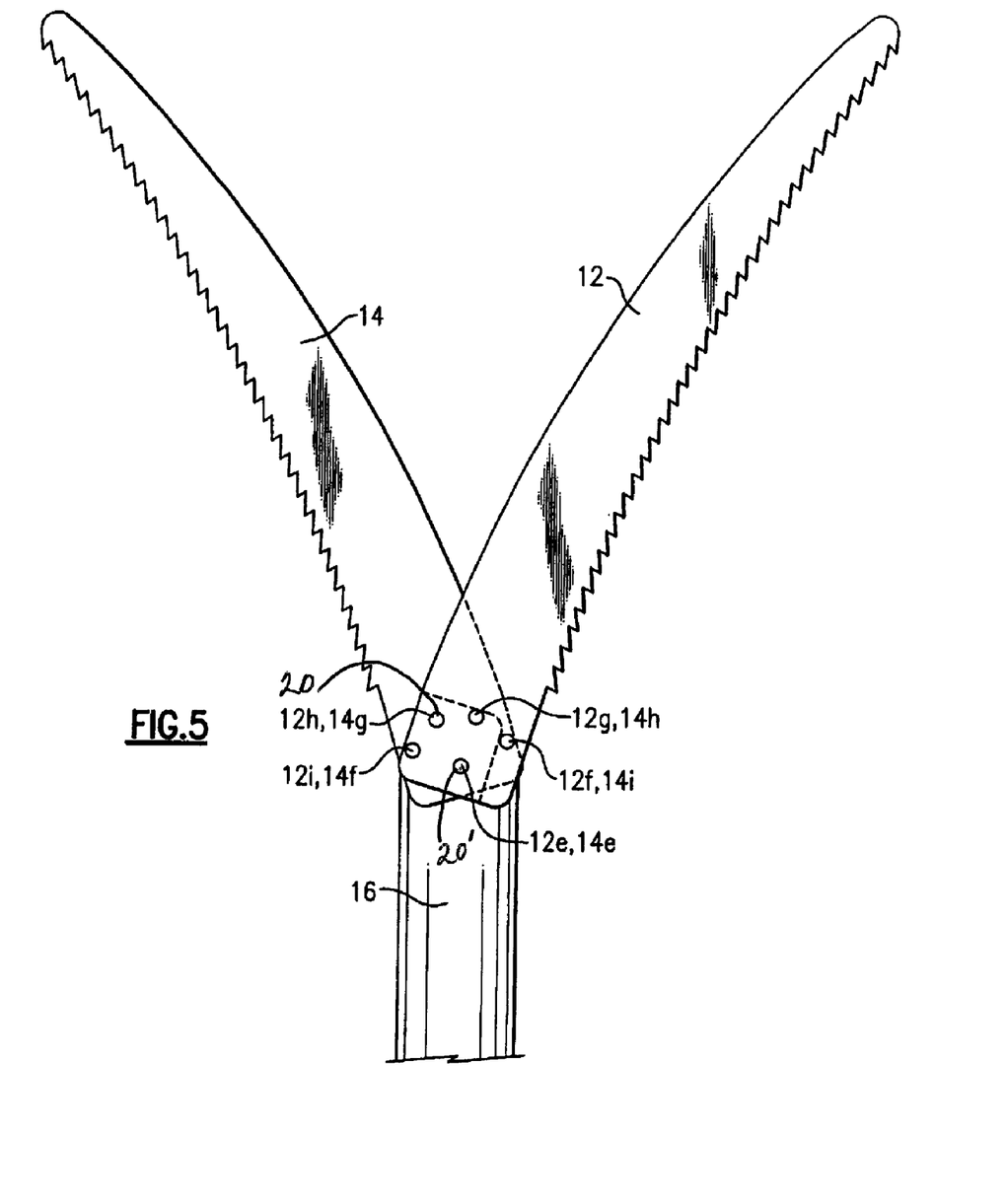
FIG. 5 is a plan view of the tool showing the blades in a first open position on the handle.
Figure 6:
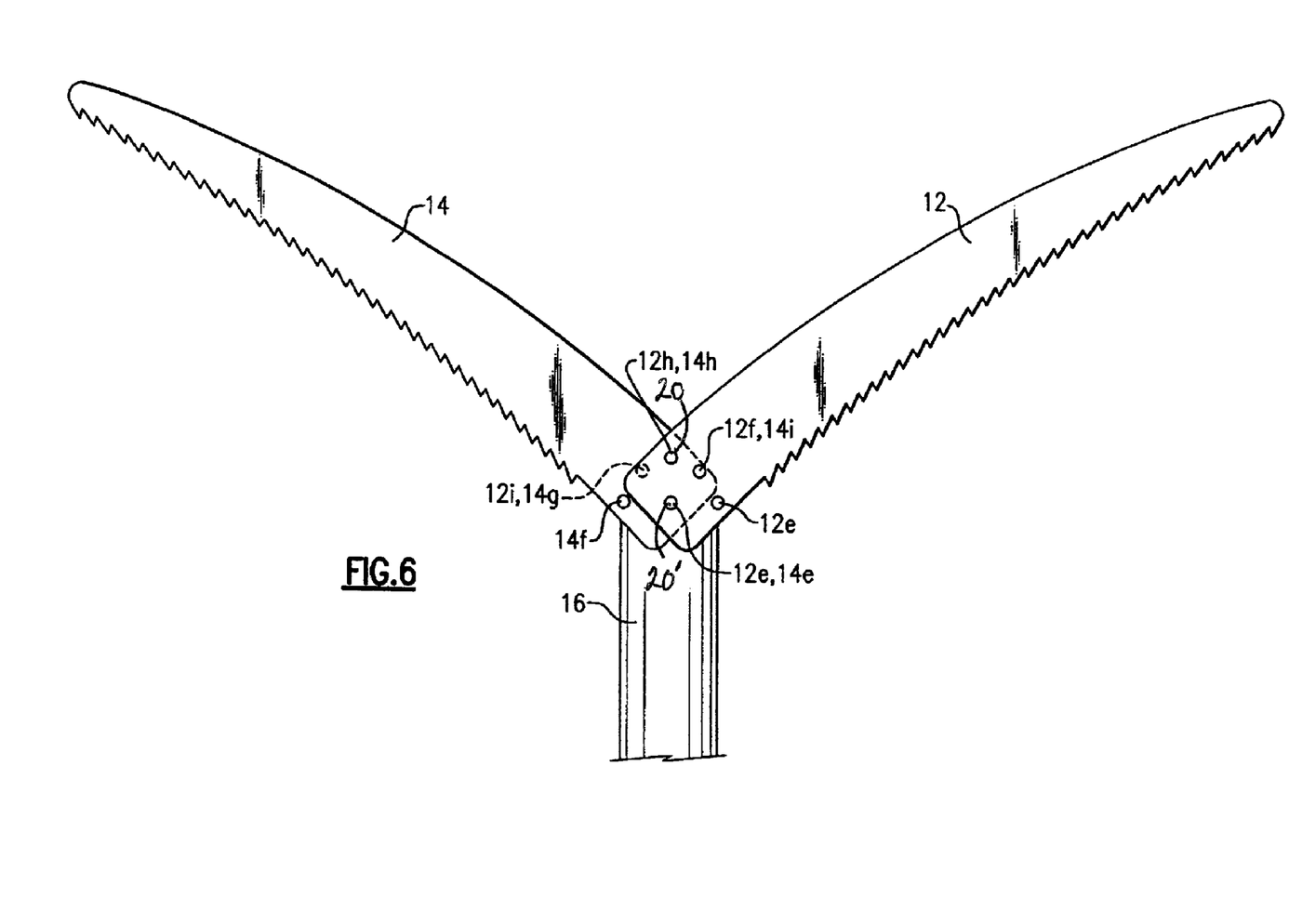
FIG. 6 is a plan view of the tool showing the blades in a second open position on the handle.
Figure 7:
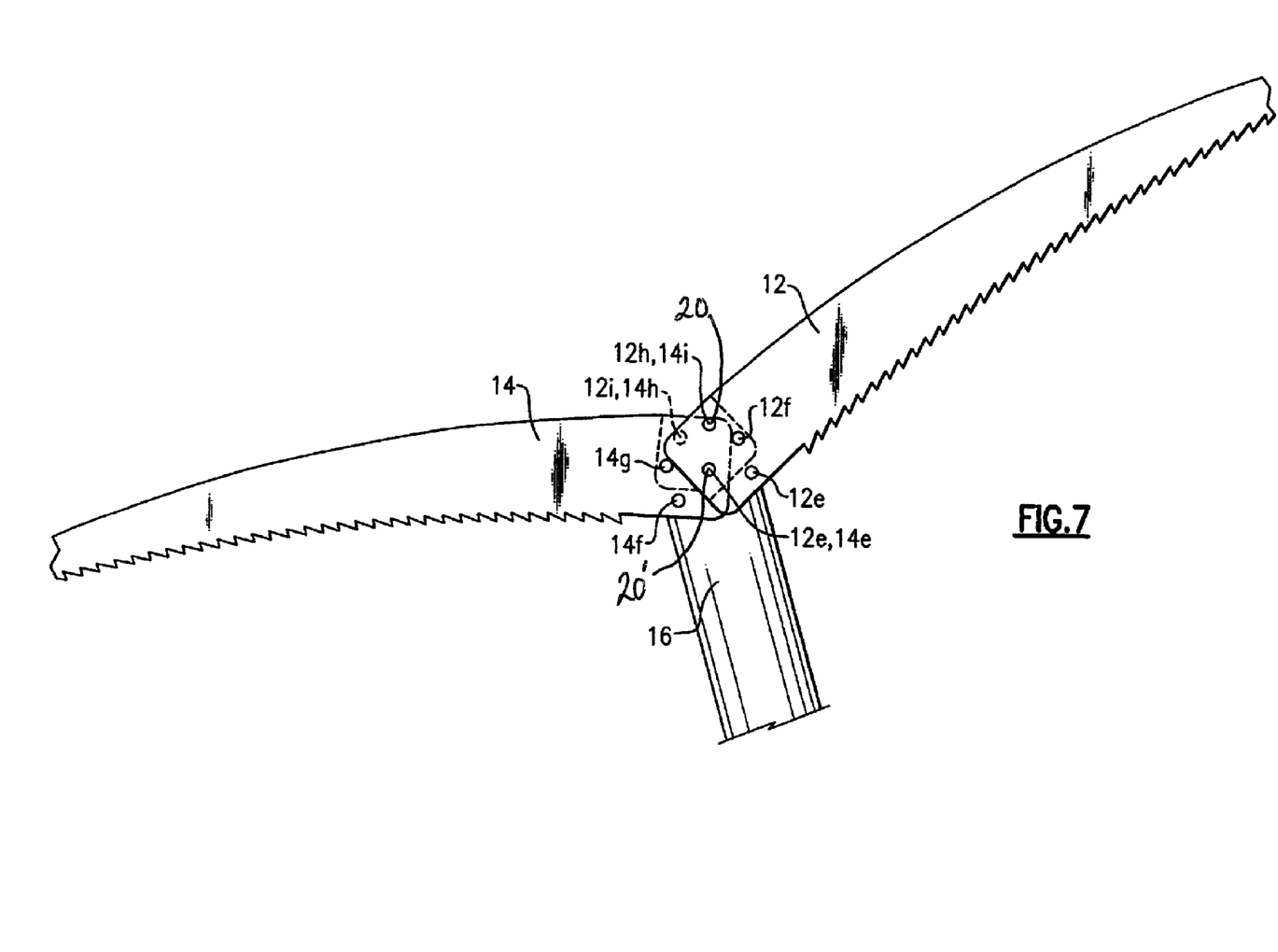
FIG. 7 is a plan view of the tool showing the blades in a third open position on the handle.

When the blades are pivoted to their fully closed angular position as seen in FIG. 4, tool 10 may be easily and safely carried to and from the water. If desired, a pair of blade guards may be provided to cover the cutting edges 12*c*, 14*c* of the blades when not in use for an added level of safety.

What is claimed is:

1. A tool for removing vegetation from a body of water, said tool comprising:
   a. an elongated handle having a distal end and a proximal end;
   b. first and second blades each having a connecting end, an opposite free end, a cutting edge and an opposite unsharpened edge, the connecting ends of said blades being pivotally mounted in overlapping relationship to said handle distal end with a first pin defining a pivot point, the angular orientation of said blades with respect to each other being adjustable through at least two holes formed in an annularly spaced pattern in each of said blades about said pivot point, the holes in one of the blades being sequentially alignable with the holes in the other blade as one blade is pivoted with respect to the other blade about said pivot point; and
   a removable second pin for selectively locking the angular orientation of said blades, when said blades are locked in at least one of said angular orientations the cutting edges of the blades facing outwardly away from each other, said second pin being securable to any selected pair of aligned holes on said first and second blades.

2. The tool of claim 1, and further comprising a series of three holes formed in an annularly spaced pattern on each blade about said pivot point.

3. The tool of claim 1 and further comprising a series of four holes formed in an annularly spaced pattern on each blade about said pivot point.

4. The tool of claim 1 wherein said cutting edges are concave and serrated.

5. The tool of claim 1 and further comprising a floatation bar for removably attaching to said cutting blades.

6. The tool of claim 1 and further comprising a handle extension for selectively attaching to said handle proximal end and thereby increase the length of said handle.

\* \* \* \* \*